No. 778,023. PATENTED DEC. 20, 1904.
N. FELLS.
GLASS CUTTER.
APPLICATION FILED JUNE 15, 1904.
NO MODEL.
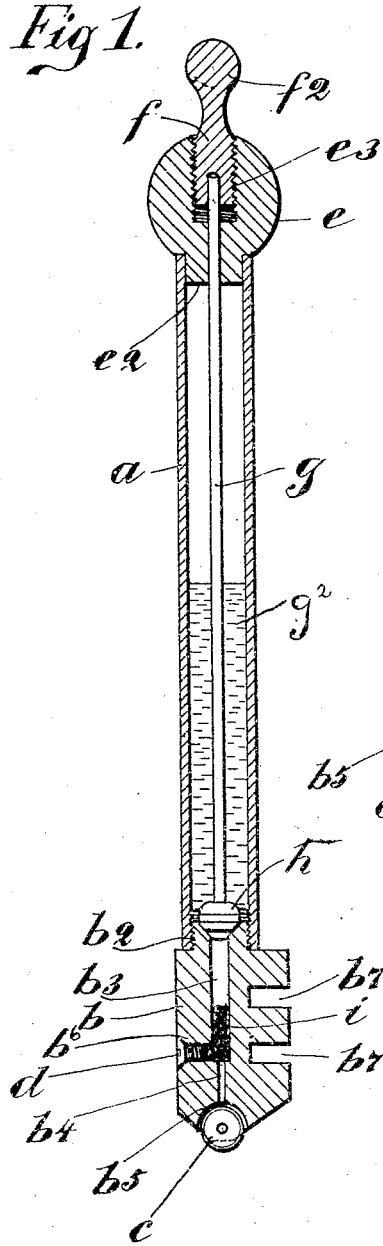
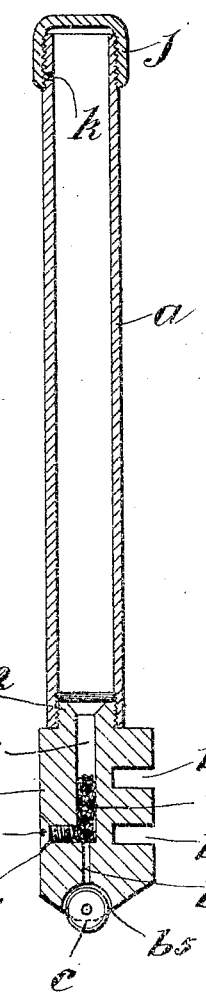
WITNESSES
O. P. Williams
F. A. Stewart
INVENTOR
Noah Fells
Edgar Tate & Co
BY
ATTORNEYS No. 778,023. Patented December 20, 1904.

UNITED STATES PATENT OFFICE.

NOAH FELLS, OF NEW YORK, N. Y.

GLASS-CUTTER.

SPECIFICATION forming part of Letters Patent No. 778,023, dated December 20, 1904.

Application filed June 15, 1904. Serial No. 212,642.

*To all whom it may concern:*

Be it known that I, NOAH FELLS, a citizen of the United States, residing at New York, in the county of New York and State of New York, have invented certain new and useful Improvements in Glass-Cutters, of which the following is a specification, such as will enable those skilled in the art to which it appertains to make and use the same.

The object of this invention is to provide an improved glass-cutting device which is simple in construction and efficient in operation and also strong and durable; and with this and other objects in view the invention consists of a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a central longitudinal section of my improved glass-cutter; Fig. 2, a similar view showing a modification; and Fig. 3, an end view of the cutter-head of the device, as shown in Figs. 1 and 2, all of said figures being on an enlarged scale.

In the practice of my invention as shown in Fig. 1 I provide a hollow member $a$, which forms a handle for the device, and this hollow member or handle may be of any desired shape in cross-section and may be made in any preferred manner. At one end of the hollow handle member $a$ is a cutter-head $b$, which in the form of construction shown is provided with a reduced screw-threaded extension $b^2$, with which the hollow handle member $a$ is connected and which is also provided with a longitudinal bore $b^3$, the outer end portion of which is preferably reduced in size, as shown at $b^4$, and in the outer end of the cutter-head $b$ is a recess $b^5$, with which the reduced portion $b^4$ of the bore $b^3$ communicates, and mounted in said recess is a cutter-wheel $c$. The cutter-head $b$ is also preferably provided at the bottom of the enlarged portion of the bore $b^3$ with a lateral opening $b^6$, closed by a screw-threaded plug $d$, and at one side of the cutter-head $b$ are notches or recesses $b^7$, which in practice are employed for the purpose of breaking off portions of glass after the glass has been cut in the usual manner.

The end of the hollow handle member $a$ opposite the cutter-head $b$ in the form of construction shown in Fig. 1 is closed by a knob or head $e$, having a reduced extension $e^2$, which enters the hollow handle member and with which said member may be connected in any desired manner, either by a screw-thread or otherwise, and said knob or head $e$ is provided with a screw-threaded recess $e^3$ in line with the axis of the hollow handle member $a$, and in said recess is placed a screw-threaded plug $f$, provided with a handle-piece $f^2$, and connected with the inner end of said plug is a valve-rod $g$, which extends longitudinally through the hollow handle member $a$ and is provided at its inner end with a valve $h$, which is adapted to close the bore or passage $b^3$ in the cutter-head $b$, as clearly shown in Fig. 1, and said valve may be of any desired form.

In practice the hollow handle member $a$ is filled or partially filled with oil, as shown at $g^2$, and the operation of this form of construction is substantially as follows:

When the separate parts of the device have been assembled and it is desired to cut a piece or sheet of glass, the plug $f$ is turned so as to raise the valve $h$ and the oil passes down through the bore $b^3$ in the cutter-head $b$ and onto the wheel $c$ and from the wheel onto the glass to be cut. This oil serves to preserve the wheel and keep it cool and also operates to produce a smooth cut in the glass and one which will not shell off or scale off at the sides thereof. It is a well-known fact that in using devices of this kind the cutter-wheel forms a cut having rough edges, the glass cracking, shelling, or scaling adjacent to the cut; but with my improvement the cut is made smooth and even throughout and the glass does not crack or shell or scale off adjacent thereto.

I also in practice place in the bottom of the enlarged portion of the bore $b^3$ in the cutter-head $b$ cotton or similar capillary material $i$, which prevents any dirt or other foreign substance which may be in the oil from passing through the reduced portion $b^4$ of said bore, and this capillary material may be removed or cleaned whenever desired or new material substituted therefor.

In Fig. 2 I have shown a modification in which the hollow handle member *a* and cutter-head *b* are the same as in Fig. 1, except that the end of the hollow handle member opposite the cutter-head *b* instead of being provided with and closed by a knob or head is closed by a screw-threaded cap *j*, and in one side of the hollow handle member is a small port or passage *k*, which is closed when the cap *j* is screwed fully onto the end of the hollow handle member. The port or passage *k* is intended for the admission of air to the hollow handle member, and in the use of this form of construction all that is necessary to permit the oil to pass into and through the cutter-head *b*, as hereinbefore described with reference to the construction shown in Fig. 1, is to turn the cap *j* so that the port or passage *k* will be opened. This operation permits air to flow into the handle member, and the oil is thus allowed to flow through the cutter-head *b*. In the drawings forming part of this specification I have shown the cutter-head *b* as oblong and rectangular in cross-section; but said head may be of any desired shape, and it also may be of any preferred construction, all that is necessary in this connection being to provide a cutter-head having a longitudinal bore or passage through which the oil is free to pass and in the end of which is mounted the cutter-wheel *c*.

Having fully described my invention, what I claim as new, and desire to secure by Letters Patent, is—

1. As an article of manufacture, a glass-cutter having a rotary cutting device provided with an oil-receptacle and a conduit or passage extending from said receptacle to the rotary cutting device for supplying a constant flow of oil to the cutting edge of said cutter, substantially as described.

2. As an article of manufacture, a glass-cutter having a rotary cutting device, provided with an oil-receptacle, a conduit from the said oil-receptacle extending to the said rotary cutting device for supplying oil thereto, and means for controlling the flow of oil through said conduit, substantially as described.

3. As an article of manufacture, a glass-cutter having a rotary cutting device provided with an oil-receptacle, a conduit extending from said oil-receptacle to the said cutting device for supplying oil thereto and a valve for controlling the flow of oil through said conduit, substantially as described.

4. As an article of manufacture, a glass-cutter provided with a revoluble cutting device, provided with a receptacle in the handle for holding oil, a conduit or passage extending from the said receptacle to the said cutting device for supplying oil thereto, and a valve for controlling the flow of oil through said conduit or passage, substantially as described.

In testimony that I claim the foregoing as my invention I have signed my name, in presence of the subscribing witnesses, this 10th day of June, 1904.

NOAH FELLS.

Witnesses:
F A. STEWART,
C. E. MULREANY.